United States Patent
Davison

(10) Patent No.: US 7,972,087 B2
(45) Date of Patent: Jul. 5, 2011

(54) VACUUM TRANSFER APPARATUS AND PROCESS WITH IMPROVED PRODUCT WEIGHING CONTROLS

(75) Inventor: Alan L. Davison, Springfield, AR (US)

(73) Assignee: Food Processing Equipment Company, Springdale, AR (US)

( * ) Notice: Subject to any disclaimer, the term of this patent is extended or adjusted under 35 U.S.C. 154(b) by 0 days.

(21) Appl. No.: 12/379,966

(22) Filed: Mar. 5, 2009

(65) Prior Publication Data

US 2010/0014924 A1 Jan. 21, 2010

(51) Int. Cl.
*B65G 51/36* (2006.01)

(52) U.S. Cl. .............. 406/28; 406/52; 406/82; 406/151; 406/169; 222/52; 222/410

(58) Field of Classification Search .................. 406/28, 406/52, 82, 151, 168, 169; 22/52, 410
See application file for complete search history.

(56) References Cited

U.S. PATENT DOCUMENTS

| | | | | |
|---|---|---|---|---|
| 2,714,533 A | * | 8/1955 | Arquint | 406/62 |
| 4,345,858 A | * | 8/1982 | Barlow | 406/34 |
| 5,006,018 A | * | 4/1991 | Depew | 406/18 |
| 5,024,561 A | * | 6/1991 | Kitagawa | 406/173 |
| 5,575,596 A | * | 11/1996 | Bauer et al. | 406/168 |
| 5,669,741 A | | 9/1997 | Ono et al. | |
| 5,765,728 A | * | 6/1998 | Simpson et al. | 222/146.2 |
| 6,089,794 A | * | 7/2000 | Maguire | 406/18 |
| 6,379,086 B1 | * | 4/2002 | Goth | 406/75 |
| 6,413,020 B1 | * | 7/2002 | Davison | 406/168 |
| 6,634,833 B2 | * | 10/2003 | Gillespie | 406/84 |
| 6,877,933 B2 | | 4/2005 | Ho et al. | |
| 7,228,990 B2 | * | 6/2007 | Schmidt | 222/77 |
| 7,264,422 B2 | * | 9/2007 | Hasselbach et al. | 406/171 |
| 7,390,119 B2 | * | 6/2008 | Maguire | 366/141 |
| 7,541,549 B2 | * | 6/2009 | Estes et al. | 177/116 |

* cited by examiner

*Primary Examiner* — Joe Dillon, Jr.

(74) *Attorney, Agent, or Firm* — Rader, Fishman & Grauer PLLC

(57) ABSTRACT

A vacuum transfer apparatus and process with weighing controls. An exemplary vacuum transfer apparatus includes a hopper that retains food product and includes a discharge port. A vacuum chamber has an inlet coupled to the discharge port of the hopper, and a member that is time-controlled to dispense product from the vacuum chamber. A portioning hopper receives product from the vacuum chamber and dispenses a predetermined weight of product.

3 Claims, 5 Drawing Sheets

VACUUM TRANSFER APPARATUS AND PROCESS WITH IMPROVED PRODUCT WEIGHING CONTROLS

FIELD OF THE INVENTION

The invention of this provisional application relates to an improvement in U.S. Pat. No. 6,413,020, the contents of which are incorporated by reference as if fully restated in this provisional application. This invention relates to an improving product weighing feature that includes a sensing means for sensing product entering a vacuum chamber and at least one strain gauge load cells on a hopper for determining product weight in the hopper.

BACKGROUND OF THE INVENTION

The prior patent of the Applicant's assignee, U.S. Pat. No. 6,413,020 describes an apparatus for vacuum transferring food product, such as chicken, that comprises a hopper for retaining food product and having a discharge port; a vacuum chamber having an inlet and an outlet, the inlet of the vacuum chamber being connected to receive product from an outlet of the hopper, and the outlet of the vacuum chamber includes means for metering discharge of the product. A first electrical timing circuit controlled the opening and closing of the vacuum source so that transport of the food product is drawn into a vacuum chamber from the hopper upon activation of the vacuum source and opening and closing of the vacuum chamber. A second electrical timing circuit controlled the time during of the vacuum pressure so that metered amounts of the food product may be transported. Additional details of the prior art embodiment from the Applicant are found in the '020 patent.

However, it was desired to improve and/or modify the metering of product with the vacuum transfer apparatus and method of the '020 patent. It was suggested by another that a load cell might be a useful device to measure the output of product.

It was desired that the improved system reduce a likelihood that the food product, such as marinating and/or marinated chicken, would lose moisture during the vacuum transfer and weighing processing, and thus dry out from exposure to atmospheric conditions. It was also of interest to automate a control for the ingress of product from a hopper to a vacuum chamber and for controlling an amount of product added to a portioning hopper receiving product from the vacuum transfer.

BRIEF SUMMARY OF THE INVENTION

Accordingly, the invention of the '020 patent was modified to include an improved product weighing arrangement that including an electronic sensor for sensing, and thus controlling, by time of opening of a gate on the processing line to the vacuum chamber, a volume of food product, e.g. chicken fillets, accumulating in a portioning hopper. Additional details are noted in the discussion of the operation of the invention.

Another feature of the invention relates to a use of data provided by electronic, strain gauge type load cells mounted to the portioning hopper in combination with product-transferring paddle to control the quantity of food product, e.g. chicken fillets, accumulated in the portioning hopper.

These and other features of the invention will be seen and understood from a review of the accompanying drawings,

DETAILED DESCRIPTION OF THE PREFERRED EMBODIMENTS

Figure 1:
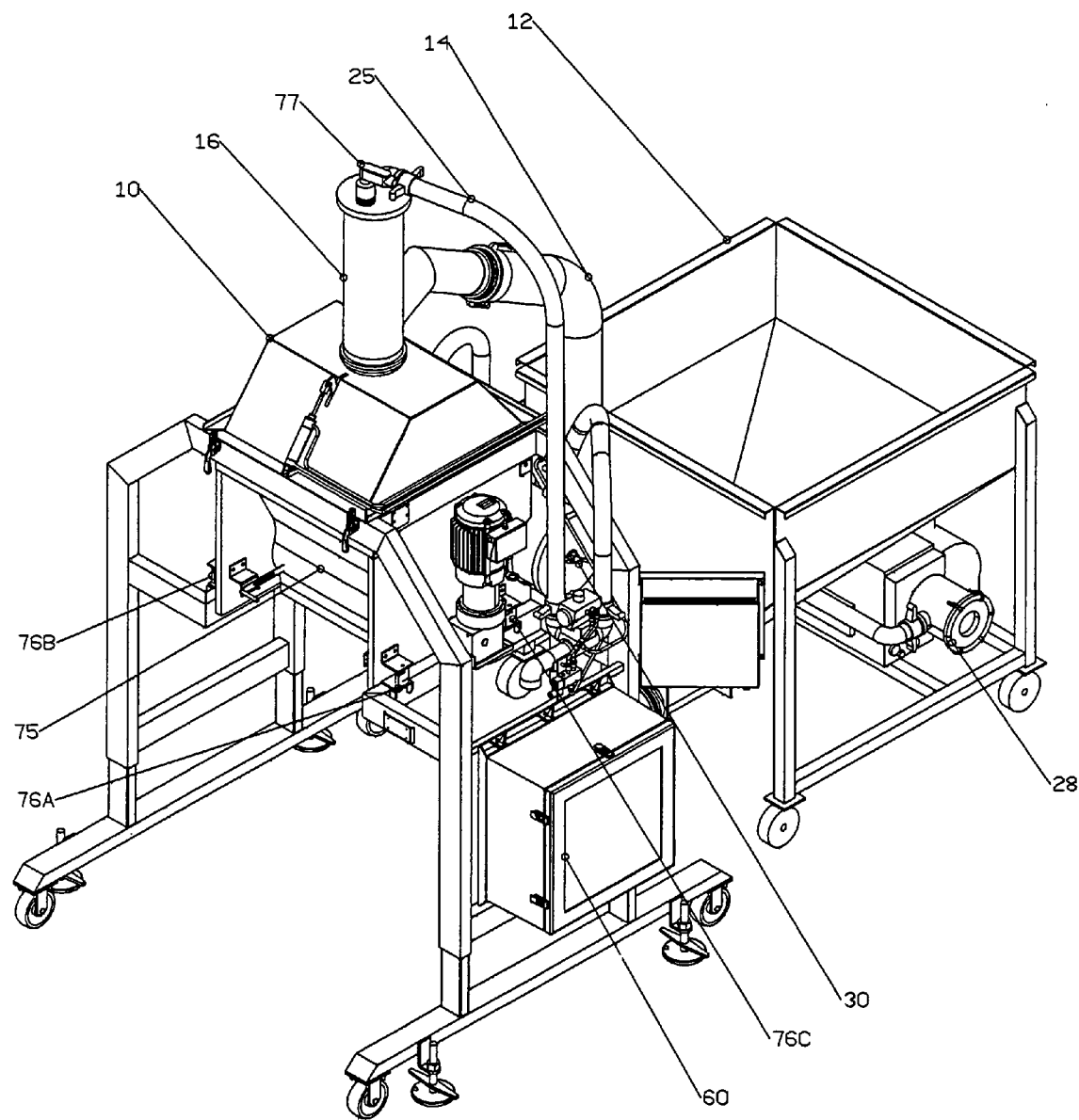
FIG. 1 is a perspective view of the improved vacuum transfer apparatus and method, similar to FIG. 1 of the '020 patent in which like reference numerals refer to like elements.
Figure 2:
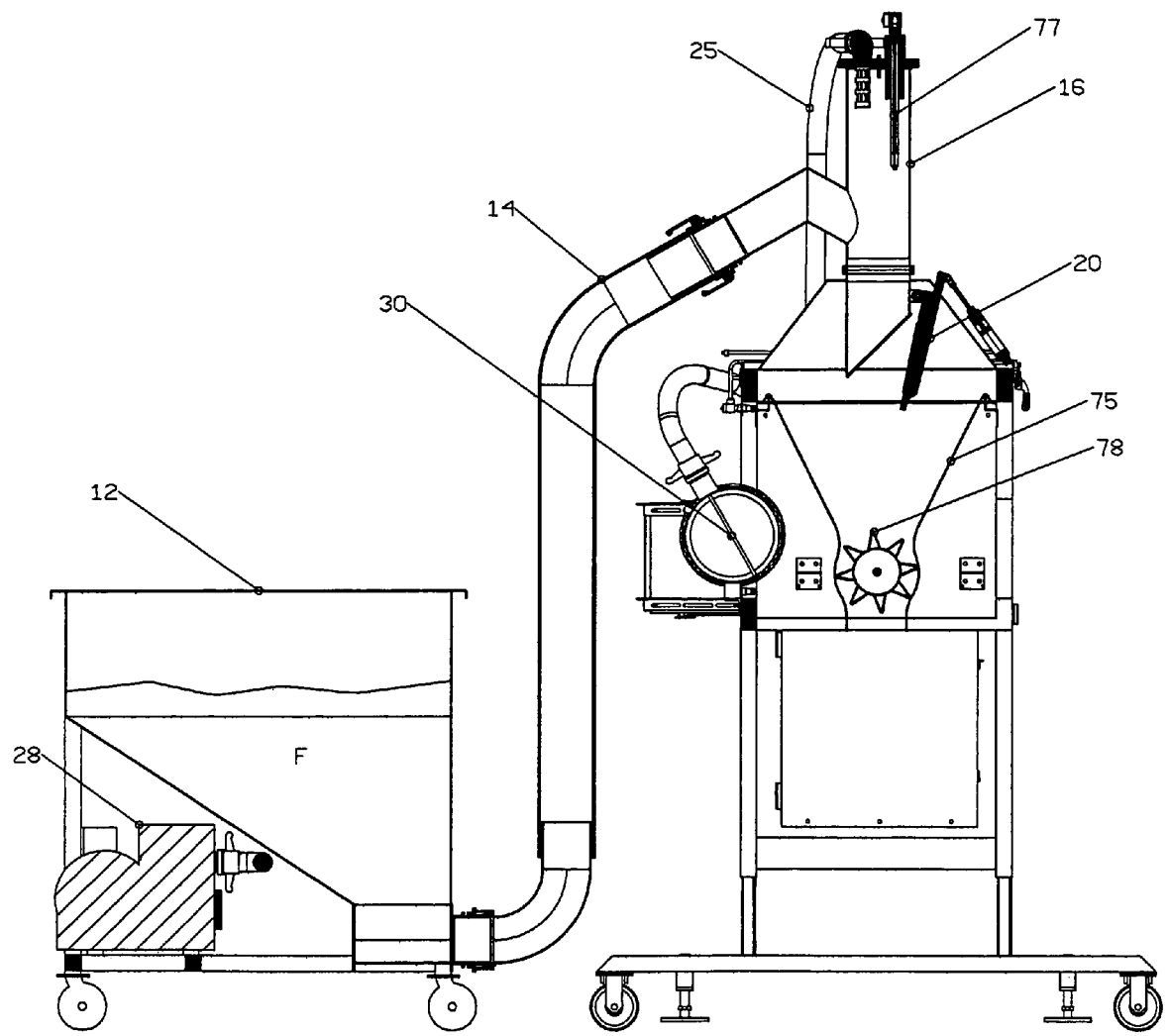
FIG. 2 is a left side elevational view of the improved vacuum transfer apparatus of FIG. 1, similar to FIG. 2 of the '020 patent and showing the electronic product sensor in the vacuum chamber.

As mentioned, this invention is an improvement on the vacuum apparatus of the '020 patent that is incorporated by reference. Where appropriate, like reference numerals are used to refer to like parts of the embodiment of the '020 patent. The improvements will be apparent from the description of the description of the operation that follows.

Operation

The operation of the embodiments of the invention disclosed herein shall be described with reference to apparatus 10, as both apparatus 10 and 100 are similarly operated. The operation of the apparatus 10 will be illustrated using marinated chicken filets as the food product (F). Marinated chicken filets may be deposited into the hopper 12 manually or automatically from an automated marinating device. The hopper 12 not only holds the chicken filets in anticipation of the transfer to the vacuum chamber 16, the hopper 12 permits the chicken filets to continue marinating, as the chicken filets and a portion of the marinate sauce are retained by the hopper 12. This storage arrangement may reduce the likelihood that the chicken filets will lose moisture, and thus, dry out from exposure to atmospheric conditions.

Figure 3A:
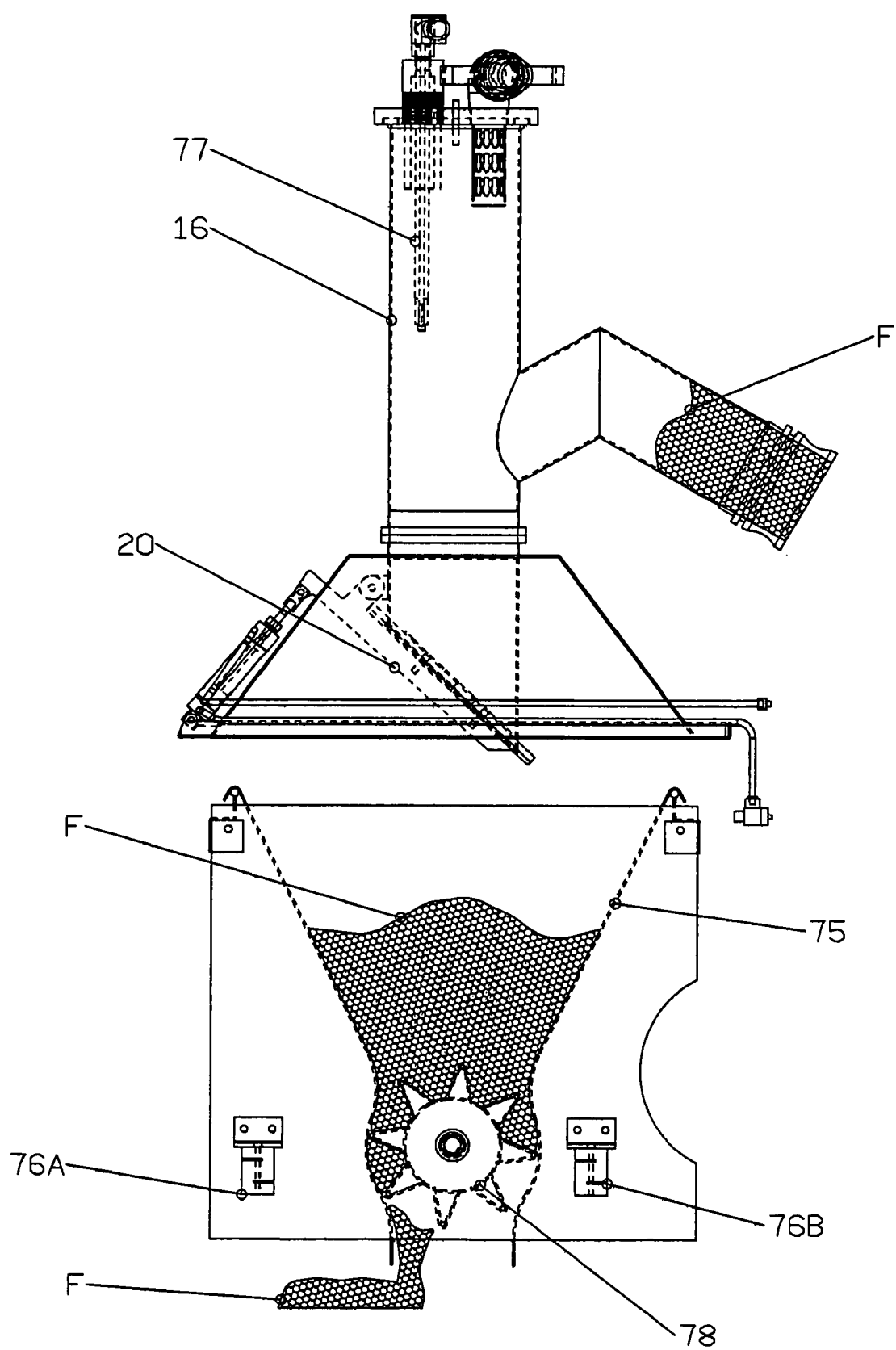
FIG. 3A is a view somewhat similar to the FIG. 3a of the '020 patent showing the portioning hopper, load cells, and paddle control.
Figure 3B:
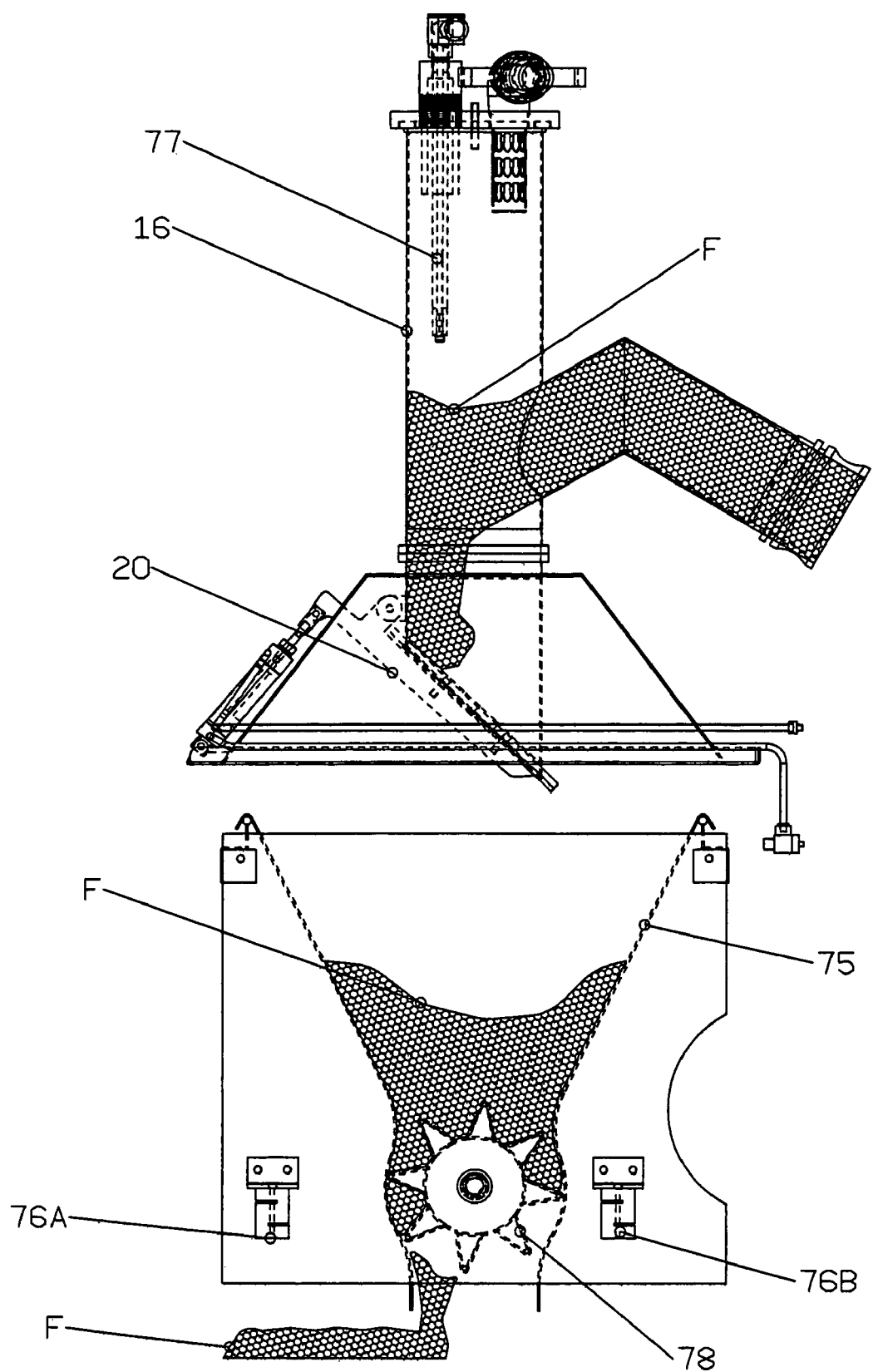
FIG. 3B is a view somewhat similar to FIG. 3b of the '020 patent showing food product F entering the vacuum chamber, and food product in the portioning hopper.
Figure 3C:
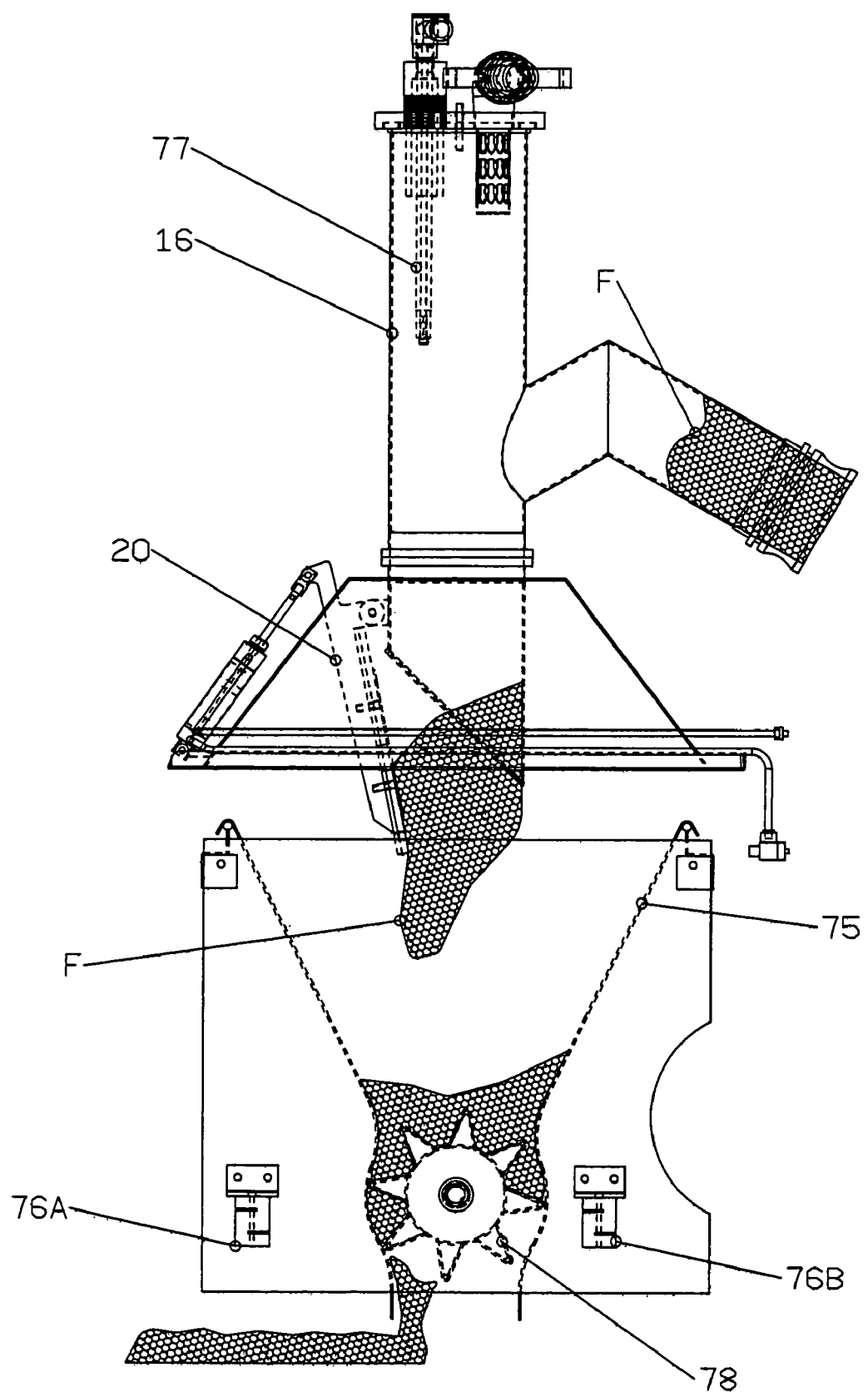
FIG. 3C is a view somewhat similar to FIG. 3c of the '020 patent showing food product F being dispensed to the portioning hopper.

As discussed in the '020 patent, when the vacuum pump 28 and the surge tank 30 are energized, a negative pressure is induced in the line 25. This negative pressure results in a vacuum pressure inside the vacuum chamber 16 as long as the gate 20 is closed. The vacuum pressure at the vacuum chamber 16 causes a portion of the chicken filets retained by the hopper 12 and a portion of the marinate sauce to be drawn into the flexible hose 14 as illustrated in FIGS. 3A, 3B and 3C.

The time period over which the vacuum pressure will be present in the line 25 and the rate at which the chicken filet is dispensed from the apparatus 10 are controlled by timing circuits T1 and T2. The timing circuits T1 and T2 are incorporated into the electrical circuitry housed by the control panel 60. Together, the timing circuits T1 and T2 permit the rate and quantity of chicken filets delivered to the processing line to be automatically adjusted to conform to the constraints of the particular operation.

The timing circuit (T2, not shown) A single cycle includes the steps of loading of the chicken filets into the vacuum chamber 16, discharging the chicken filets into the portioning hopper 75, and a machine idling (dwell) period. The opening and closing of the gate 20 may indicate the end of a single cycle. Once the gate 20 opens and closes, the apparatus 10 will dwell, sit idle for a period of time. This dwell is adjusted automatically based on data provided by electronic load cells 76a and 76b mounted to the portioning hopper 75. T2 automatically adjusts frequency of cycles to permit an increase or decrease in the volume of chicken filets accumulating in the portioning hopper 75.

The quantity of chicken filets drawn into the flexible hose 14 during a given cycle is fixed and controlled by an electronic level sensing probe 77. In the preferred embodiment, the timing circuit (T2) permits the vacuum to be drawn though the line for approximately 4 to 5 seconds. During this time period, approximately 3 to 4 pounds of chicken filets are accumulated in the vacuum chamber 16. This feature, thus, provides an improvement over existing systems which do not provide for the automatic transfer of a predetermined amount of a food product (F) from a storage container (hopper 12) over a predetermined time interval.

Timing circuit (T1, not shown) controls the rotational speed of the paddle wheel 78. The portioning hopper 75 accumulates chicken filets deposited by vacuum chamber 16. The electronic load cells 76a and 76b on the portioning hopper 75 are included in the timing circuit T1. T1 automatically adjusts to discharge a pre-set, and adjustable, quantity of chicken filets according to the weight of chicken fillets in the hopper 75. Preferably, strain gauge load cells are provided to determine the product weight in the hopper 75 to provide data for portioning output from the hopper 75. For example, the paddle wheel 78 will turn faster to deliver more chicken filets to the processing line or turn slower to deliver less chicken filets to the processing line. For this feature, an optimum speed is established for a driving motor for the paddle wheel that is responsive to the load cells, so that more or fewer chicken fillets are delivered according to the driving speed of the paddle wheel 78.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An apparatus for vacuum transferring food product, comprising:
   a hopper for retaining food product, the hopper including a discharge port;
   at least one vacuum chamber having an inlet and an outlet, wherein the inlet is coupled to the discharge port of the hopper, and the outlet of the vacuum chamber includes a member that is time-controlled to dispense product from the vacuum chamber;
   a portioning hopper receiving product from said vacuum chamber including a dispensing means for dispensing a predetermined weight of product from the portioning hopper to an outlet of said apparatus.

2. The apparatus as set forth in claim 1 wherein said vacuum chamber includes an electronic level sensing probe for controlling a quantity of food product provided for said vacuum chamber from said hopper.

3. The apparatus as set forth in claim 1 wherein said portioning hopper includes a paddle wheel rotating in response to output data from said load cell to provide predetermined output from said portioning hopper.

* * * * *